United States Patent [19]
Nilsson et al.

[11] Patent Number: 4,944,528
[45] Date of Patent: Jul. 31, 1990

[54] AUTOMATIC-IGNITION DEVICE FOR VEHICLE CRASH PROTECTION DEVICE

[75] Inventors: Karl E. Nilsson, Ottobrunn; Siegfried Zeuner, Munich, both of Fed. Rep. of Germany

[73] Assignee: Bayern-Chemie, Gesellschaft für flugchemische Antriebe mbH, Aschau am Inn, Fed. Rep. of Germany

[21] Appl. No.: 376,827

[22] Filed: Jul. 7, 1989

[30] Foreign Application Priority Data

Jul. 19, 1988 [DE] Fed. Rep. of Germany ....... 3824469

[51] Int. Cl.⁵ .............................................. B60R 21/26
[52] U.S. Cl. ..................................... 280/741; 422/165
[58] Field of Search ................. 280/736, 741; 422/165

[56] References Cited

U.S. PATENT DOCUMENTS

| | | | |
|---|---|---|---|
| 4,547,342 | 10/1985 | Adams et al. | 280/741 |
| 4,561,675 | 12/1985 | Adams et al. | 280/741 |
| 4,734,265 | 3/1988 | Nilsson et al. | 280/741 |

Primary Examiner—Kenneth R. Rice
Attorney, Agent, or Firm—Kenyon & Kenyon

[57] ABSTRACT

An automatic-ignition device for a vehicle crash protection device for passengers having a gas generator, whereby a reliable automatic releasing action is attained in case of an overheating, especially when a light-metal main gas generator housing is used. A primary ignition mixture is contained in a housing structure which is thermally insulated from the main gas generator housing. The primary mixture housing structure forms a heat seal thermally insulated from the main gas generator housing.

9 Claims, 1 Drawing Sheet

U.S. Patent    Jul. 31, 1990    4,944,528
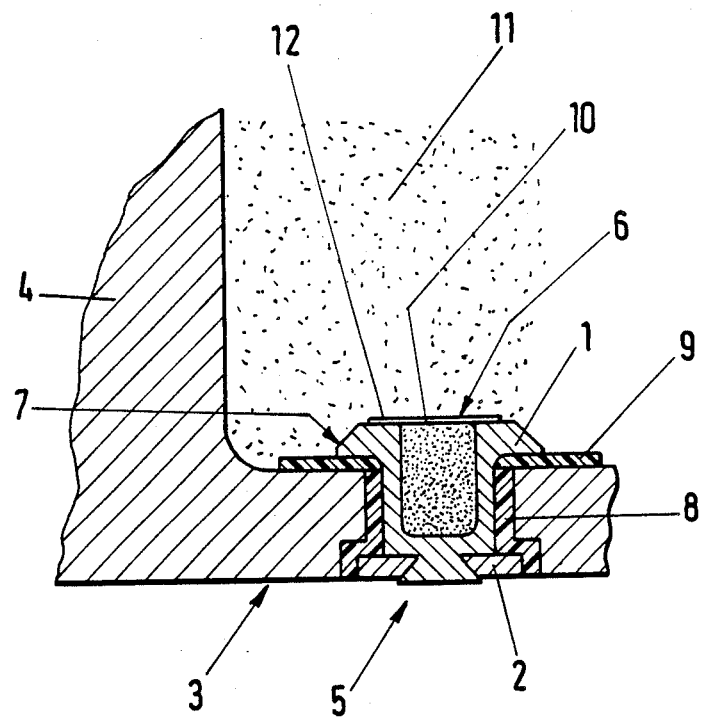

AUTOMATIC-IGNITION DEVICE FOR VEHICLE CRASH PROTECTION DEVICE

BACKGROUND OF THE INVENTION

The present invention relates to an auto-ignition device for a vehicle crash protection device, e.g., an air bag, for passengers with a gas generator arranged in a housing structure. This gas generator features a primary igniting mixture, which is ignitable at a low ambient temperature and is embedded in a metal housing structure containing a window provided with a dam. This window is aligned toward a secondary igniting mixture or the gas generant compound.

U.S. Pat. No. 4,561,675 describes such an arrangement. In this connection, a metal housing structure containing a primary igniting mixture, which automatically ignites at an ambient temperature of approximately 177° C., is mounted inside the closed gas generator housing and is aligned either toward the secondary igniting mixture, which is ignitable at approximately 343° C., or toward the gas generant compound. The disadvantage of this specific embodiment is that the gas generator housing, which has a high heat capacity due to its material strength, must be heated to its ignition temperature in order to ignite the primary igniting mixture. In this case, the danger is that the dissipation of heat in case of fire can cause the automatic releasing action to be delayed too long, which can lead to a fragmentation of the housing.

Therefore, it is an object of the present invention to provide an auto-ignition device, so that when metals, especially light metals or other light construction materials are used for the gas generator housing, a reliable automatic releasing is attained under the influence of heat. Normally, such heat is not produced in the operational case or in storage, without the gas generator housing being subject to the danger of fragmentation. This danger is due, on the one hand, to the rising gas pressures in the inner space and, on the other hand, to the decreasing tensile strength, as the result of increasing temperature. At the same time, however, the density of the gas generator housing should remain intact.

SUMMARY OF THE INVENTION

The above and other objects of the invention are achieved by an auto-ignition device for a vehicle crash protection device for passengers with a gas generator arranged in a housing structure, whereby said gas generator features a primary igniting mixture, which is ignitable at a low ambient temperature and is embedded in a metal housing structure containing a window, which is provided with a dam and is aligned toward a secondary igniting mixture or the gas generant compound, wherein the primary igniting mixture housing is installed and is thermally insulated in the outer wall of the gas generator housing such that, in the area of the outer wall, a heat sink is formed, which is thermally insulated from the gas generator housing.

The particular advantage of the invention is that, should overheating occur, it is substantially ruled out that the gas generator housing would be fragmented, especially if light construction material is used. This is due to a simple structural design of the primary igniting mixture housing.

BRIEF DESCRIPTION OF THE DRAWING

The invention will be described in greater detail in the following detailed description with reference to the single drawing figure which schematically depicts, in a simplified version, the cross section of a primary ignition device.

DETAILED DESCRIPTION

The primary igniting mixture housing 1, comprising metal, which contains the primary igniting mixture 10 at approximately 160–180° C. ambient temperature, is inserted in an opening of the outer wall 3 of the gas generator housing 4, with the aid of a molded component 8 of thermally insulated plastic. The fastening is accomplished, on one side, by flange 7 provided on the inner side and, on the other side, by an additional form-fit housing part 2, which, in the exemplified embodiment, is rivited to the housing part 1. It is easily possible to select other types of fastenings. In the area of the flange 7, a disk 9 of elastic material, such as, for example, rubber, plastic or silicone rubber, is provided as additional insulation and acts as a seal.

The primary igniting mixture housing 1 contains a recess, which is filled with the primary igniting mixture 10 and whose window 6 is sealed with a thin dam 12. The window is aligned directly toward the secondary igniting mixture 11.

The form of the primary igniting mixture housing 1, 2 can be varied in any way. For example, the wall in the area of the heat sink 5 can be designed with a relatively small thickness. On the other hand, the housing part 2, serving as a heat sink, can be designed in a way, such that a heat sink 5 is obtained with the largest surface possible.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An automatic-ignition device for a vehicle crash protection device for passengers having a gas generator arranged in a housing, said gas generator comprising a primary igniting mixture ignitable at a low ambient temperature and being embedded in a primary igniting mixture metal housing structure containing a window, the window having a dam and being aligned toward a secondary igniting mixture for generating gas, the primary igniting mixture metal housing structure being disposed thermally insulated in an outer wall of the gas generator housing such that, in the area of the outer wall, a heat sink is formed, which is thermally insulated from the gas generator housing.

2. The automatic-ignition device recited in claim 1, wherein the primary igniting mixture housing structure has a small wall thickness in the area of the heat sink.

3. The automatic-ignition device recited in claim 1, wherein the heat sink comprises a material with higher heat conductivity than the gas generator housing.

4. The automatic-ignition device recited in claim 1, wherein the primary igniting mixture housing structure comprises a flange adjacent the window.

5. The automatic-ignition device recited in claim 1, wherein the primary igniting mixture housing structure comprises at least two form-fitted parts.

6. The automatic-ignition device recited in claim 1, wherein the primary igniting mixture housing structure is installed in the gas generator housing by a thermally insulating molded component.

7. The automatic-ignition device recited in claim 6, wherein the molded component comprises plastic.

8. The automatic-ignition device recited in claim 4, wherein an insulator of elastic material is arranged between the flange and the gas generator housing.

9. The automatic-ignition device recited in claim 8, wherein the insulator comprises an elastic sealing disk.

* * * * *